United States Patent
Arora et al.

(10) Patent No.: US 6,330,790 B1
(45) Date of Patent: Dec. 18, 2001

(54) OIL SUMP BUFFER SEAL

(75) Inventors: Gulshan K. Arora, Mesa; Donn A. Groninger; Francis Leech, both of Tempe; Bobby J. Hobbs, Chandler, all of AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/428,092

(22) Filed: Oct. 27, 1999

(51) Int. Cl.⁷ .......................................................... F02C 7/06
(52) U.S. Cl. ..................... 60/39.08; 415/112; 415/168.4; 277/303; 277/304; 277/423
(58) Field of Search .......................... 60/39.08; 415/111, 415/112, 168.2, 168.4; 277/305, 304, 423

(56) References Cited

U.S. PATENT DOCUMENTS

| | | |
|---|---|---|
| 1,773,067 | 8/1930 | Ver Planck . |
| 1,878,731 | 9/1932 | Thompson . |
| 3,235,269 | 2/1966 | Olesen . |
| 3,302,951 | 2/1967 | Olesen . |
| 4,099,727 | 7/1978 | Weiler . |
| 4,156,342 | 5/1979 | Korta et al. . |
| 4,189,156 | 2/1980 | Geary, Jr. et al. . |
| 4,193,603 | 3/1980 | Sood . |
| 4,257,617 | 3/1981 | Hill . |
| 4,373,858 | * 2/1983 | Eastman ............................. 415/112 |
| 5,042,963 | 8/1991 | Sorensen et al. . |
| 5,160,005 | 11/1992 | Burch . |
| 5,412,977 | 5/1995 | Schmohl et al. . |
| 5,454,689 | 10/1995 | Falavigna . |
| 5,489,190 | 2/1996 | Sullivan . |
| 5,538,258 | 7/1996 | Hager et al. . |
| 5,619,850 | 4/1997 | Palmer et al. . |

* cited by examiner

Primary Examiner—Timothy S. Thorpe
Assistant Examiner—Ehud Gartenberg
(74) Attorney, Agent, or Firm—Robert Desmond, Esq.

(57) ABSTRACT

A buffer seal arrangement is provided for improved buffer sealing of oil sump seals in gas turbine engines. The buffer seal arrangement includes a three section labyrinth seal. Disposed between the first and second section is a buffer air supply annulus for delivering pressurized air from the engine to said first and second sections of the seal. Oil drains are disposed between said second and third sections and adjacent the third section. The first section has four knife seals, and the second and third sections have three knife seals. Rig testing has shown that this buffer seal arrangement can prevent the leakage of oil into the gas path of the gas turbine engine.

16 Claims, 6 Drawing Sheets

1

OIL SUMP BUFFER SEAL

TECHNICAL FIELD

This invention relates generally to improvements in oil seals and related seal systems for preventing oil leakage in connection with rotating shafts, and particularly to a buffer seal for use in gas turbine engines for preventing oil contamination of engine bleed air used in pressurizing an aircraft cabin.

BACKGROUND OF THE INVENTION

Multiple spool gas turbine engines are generally known in the art, wherein at least two turbocompressor rotating groups are provided in association with a combustor. Each turbocompressor rotating group comprises a compressor stage and a turbine stage mounted on a common spool or shaft, with the shafts of separate rotating groups being arranged in concentric relation to each other. In a typical twin spool engine, a high pressure spool includes a compressor stage and a turbine stage disposed on opposite sides of the engine combustor, and rotatably interconnected by a hollow shaft which rotatably receives the shaft of a low pressure spool including a compressor stage and a turbine stage. In operation, the compressor stages of the low and high pressure spools provide dual stage compression of air which is supplied to the combustor for combustion with a suitable fuel. The hot gases of combustion are then expanded in series through the turbine stages of the high and low pressure spools, respectively, to provide an engine power output. One advantage of multiple spool gas turbine engines of this general type is that such engines can accelerate rapidly in order to accommodate increased power output requirements.

Gas turbine engines of the multiple spool type include a significant number of rotating and related bearing components which require lubrication for continued engine operation. In this regard, oil lubrication systems are well-known for delivering lubricant to selected bearings and related structures throughout the engine. Sump seals having a labyrinth or similar configuration are normally provided to prevent leakage of lubricating oil into the main flow path of air and combustion gases through the engine. Buffer seal arrangements have been proposed to pressurize engine sump seals in order to decrease the likelihood of oil leakage.

It is a common practice in gas turbine engines to supply a small quantity of air from the flow path to buffer oil sump seals at various locations throughout the engine. FIG. 1 shows a common arrangement for buffering an oil sump seal. In this arrangement, pressurized air 1 from the engine is delivered to an annulus 2 in between the buffer labyrinth seal 9 having an aft portion 3 and a forward portion 4. The aft portion has three knife seals while the forward portion 4 has only a single knife seal and a slinger 5. A first portion of the air from annulus 2 flows forward through the forward portion 4, through an oil sump carbon ring seal 6 and to the oil sump 7, while a second portion of the air flows across the three knife seals into a cavity 8. The purpose of providing a buffer seal 9 adjacent the oil sump seal 6 is to provide an adequate air-to-oil differential pressure across the oil sump seal 6 at all points in the flight envelop so that oil leakage across the sump seal 6 is prevented. In spite of all the care exercised in designing oil sump seals and providing adequate buffer air pressure, oil sump seals have been known to still leak oil at some point during the life of the engine. This oil leak can be due to an excessively worn out sump seal, a cracked sump seal, a coked sump seal, low or reverse differential pressure during transient or some steady state point in the operating envelop. If this oil leak location is forward of the bleed air port location in the engine gas flow path, this oil leak can contaminate the bleed air. The oil contamination of bleed air can cause an unpleasant odor in the cabin as this bleed air is used to pressurize the aircraft cabin. This is an unacceptable scenario which may result in an inflight shutdown or unscheduled removal of the engine from the airframe.

Accordingly, there exists a need for further improvements in bleed air buffer seal arrangements for use in all types of gas turbine engines to positively prevent sump seal oil leakage from contaminating the bleed air throughout the range of normal engine operating conditions.

SUMMARY OF THE INVENTION

An object of this invention is to provide an improved oil buffer seal system for use in all types of gas turbine engines to prevent sump seal oil leakage from contaminating the bleed air throughout the range of normal engine operating conditions.

The present invention achieves this object by providing a buffer seal arrangement that includes a three section labyrinth seal. Disposed between the first and second section is a buffer air supply annulus for delivering pressurized air from the engine to said first and second sections. Oil drains are disposed between the second and third sections and adjacent the third section. The first section has four knife seals, and the second and third sections have three knife seals. When compared to prior art seal arrangeements, rig testing has shown that this buffer seal arrangement is more effective in preventing the leakage of oil into the gas path of the gas turbine engine.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 2:
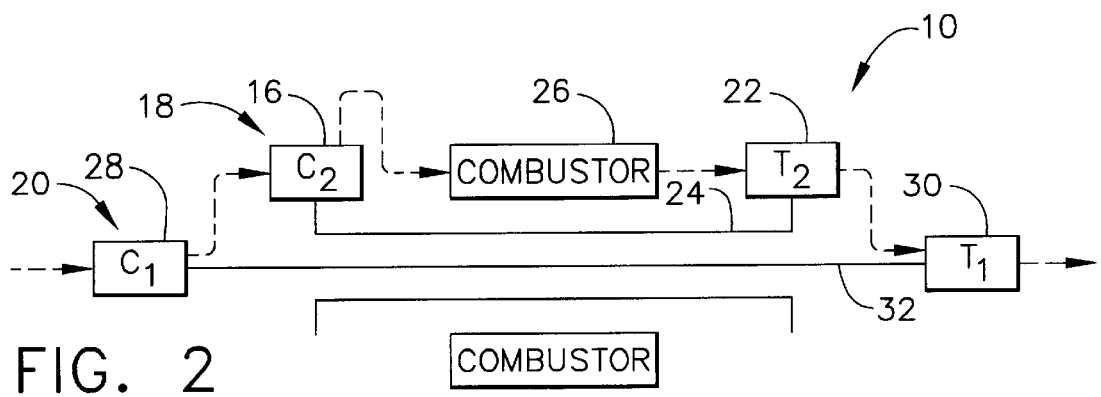
FIG. 2 is a schematic of a gas turbine engine.

FIG. 2 schematically depicts a typical multispool configuration for a gas turbine engine of a type adapted for beneficial use of the improved buffer seal arrangement of the present invention. As shown, the engine 10 comprises a high pressure spool 18 and a low pressure spool 20. The high pressure spool 18 comprises the high pressure compressor stage 16 and a related turbine stage 22 mounted at opposite ends of a hollow rotatable shaft 24, with an engine combustor 26 disposed therebetween. The low pressure spool 20 also includes a compressor stage 28 and a related turbine stage 30 mounted at the opposite ends of a rotatable shaft 32, wherein the shaft 32 of the low pressure spool 20 passes through and is rotatably supported within the shaft 24 of the high pressure spool 18.

Figure 3:
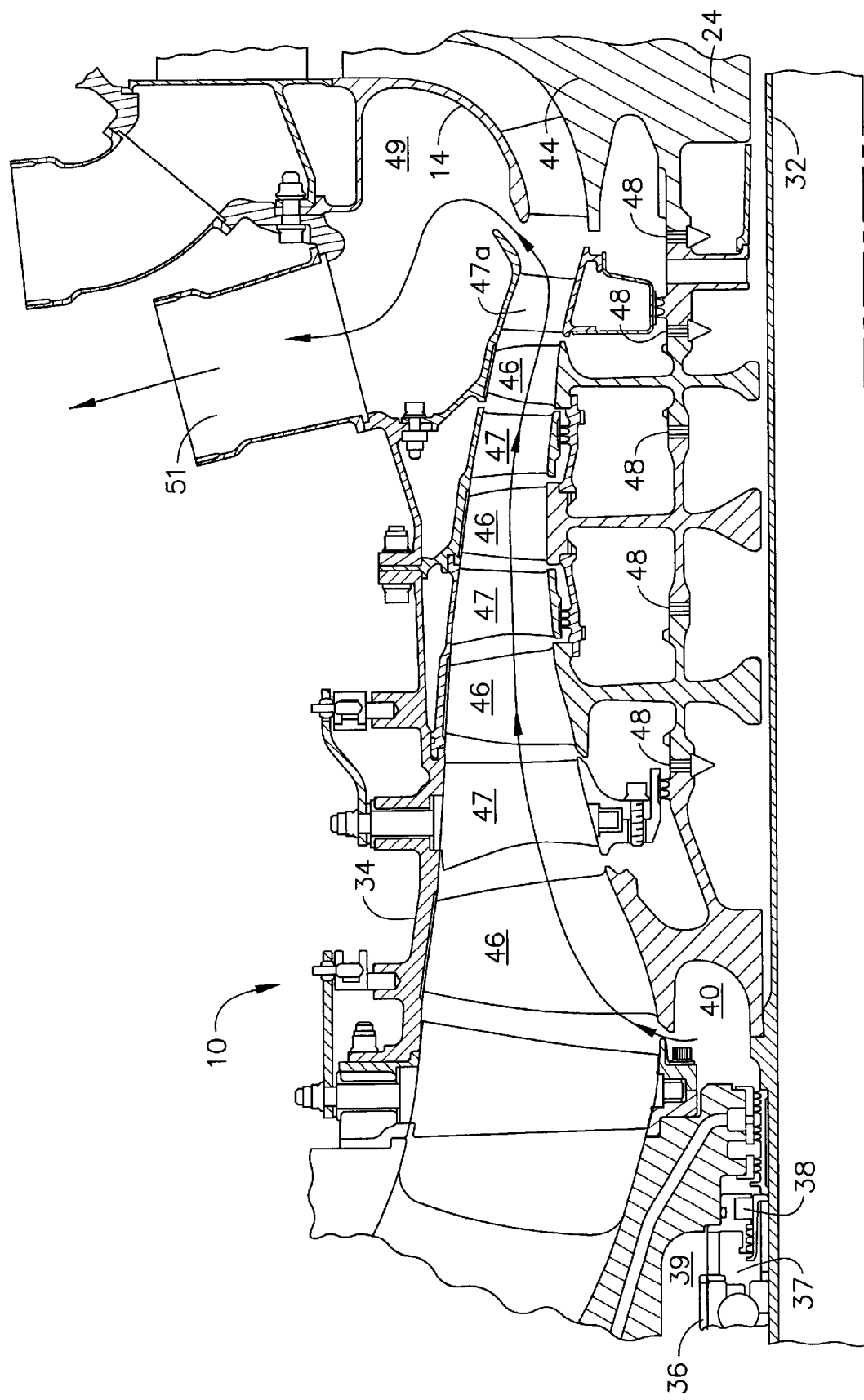
FIG. 3 is cross-section of a portion of a gas turbine engine having the oil buffer seal system contemplated by the present invention.

Referring to FIG. 3, the various rotating components of the gas turbine engine 10 are mounted within an appropriate housing or casing 34 and rotatably supported by appropriate bearings 36 only one of which is shown. More specfically, the compressor stage 16 of the high pressure spool 18 includes a centrifugal impeller 44 mounted on the shaft 24 within the appropriately contoured impeller shroud 14. Also, part of the compressor stage 16 are a plurality axial-type rotating compressor wheels 46 and axial compressor stators 47. The axial wheels 46 and impeller 44 are coupled in series by curvic couplings 48 while the stators 47 are mounted to the housing 34. Disposed between the last stator 47a and impeller 44 is a plenum 49 through which air flows from the compressor stage 16 to a bleed duct 51.

In operation, the compressor stages 28 and 16 of the separate spools provide dual stage series-flow compression of air which is drawn in by the engine 10 for supply to the combustor 26. The compressed air is burned within the combustor with a suitable fuel (not shown) to generate a high energy mass flow of hot exhaust gases for series-flow expansion through the dual turbine stages 22 and 30. Multiple spool gas turbine engines of this general type are used in a wide range of different applications wherein transient speed conditions and power loads are encountered.

As is known in the art, the bearings 36 located throughout the engine are normally supplied with an appropriate lubricating oil circulated through internal oil flow passages which flows through the bearing and into an oil sump 37. From the oil sump 37 the oil flows radially outward and back to the gearbox through passages 39. A description of a typical system for supplying oil to the bearing and returning it to the gearbox can be found in Sullivan U.S. Pat. No. 5,489,190 which is incorporated herein by reference to the extent necessary to understand the present invention.

Figure 4:
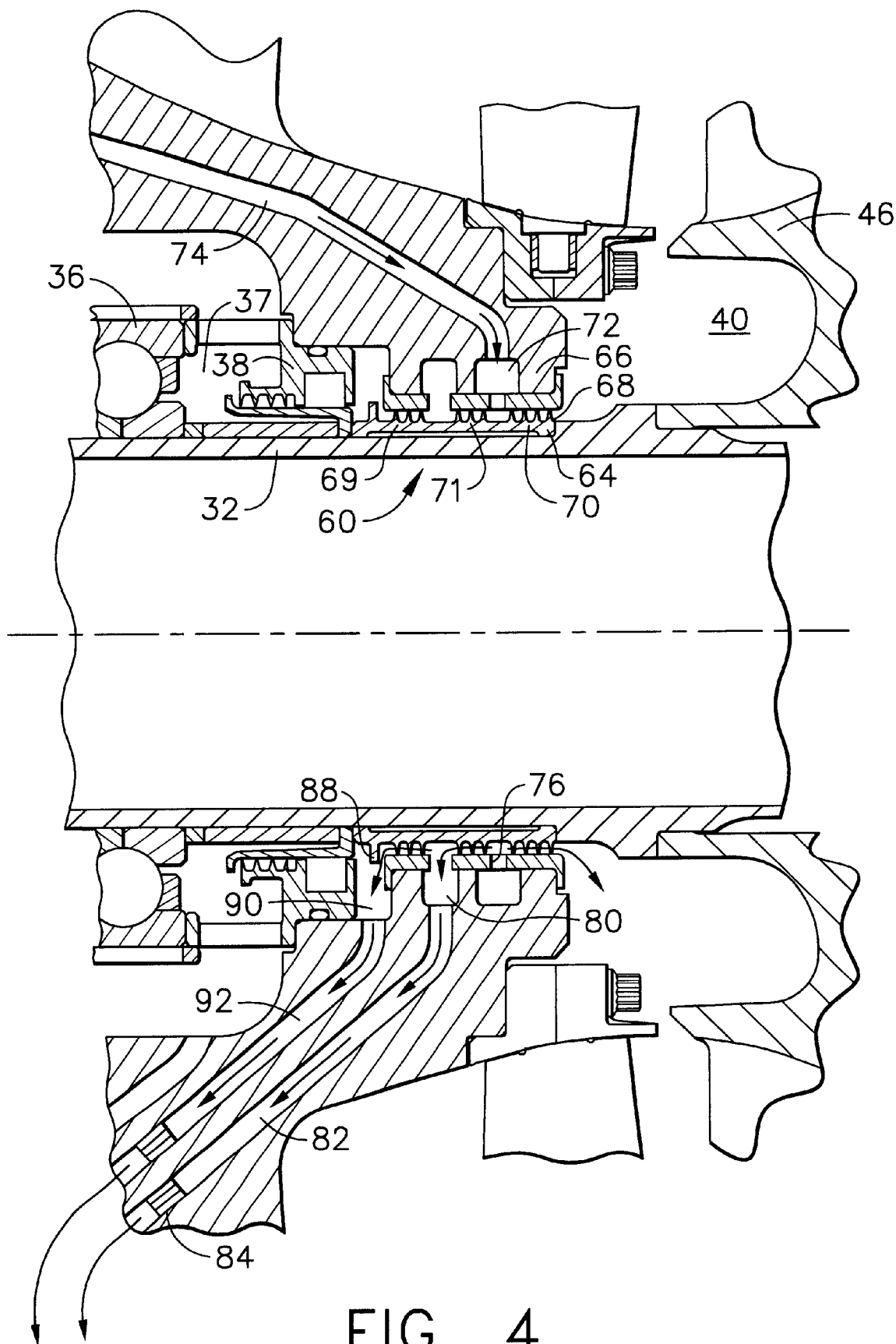
FIG. 4 is a cross-section of a oil buffer seal system contemplated by the present invention.

Referring to FIG. 4, the bearing 36 is mounted in the high pressure spool compressor 16. Disposed adjacent the bearing 36 is the oil sump 37 and an oil sump carbon ring seal 38. Disposed between the seal 38 and a cavity 40 is a buffer labyrinth seal system 60. The system 60 includes a labyrinth seal having a rotating sleeve 64 mounted to shaft 32 and a stationary sleeve 66 mounted to the engine housing 34. Extending radially from the rotating sleeve 64 are a plurality of knife edges also referred to as sealing knives 68 that are in sealing engagement with the inner surface of the stationary sleeve 66.

Figure 5A:
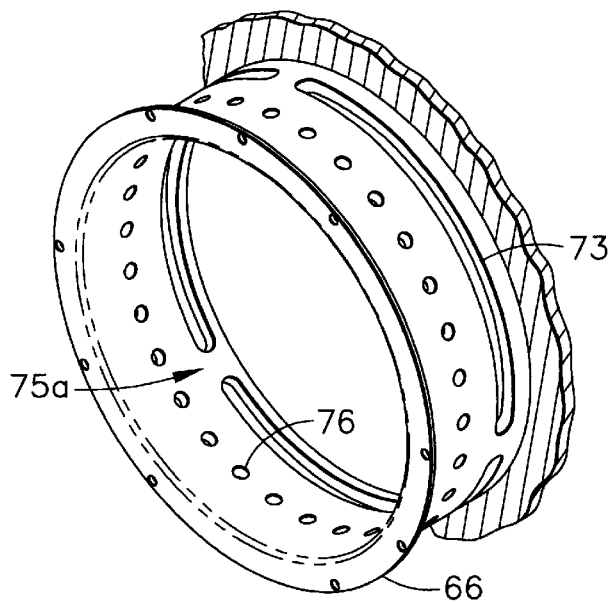
FIGS. 5a, 5b, and 5c show persepctive view of three embodiments of the stationary sleeve of the oil buffer seal system contemplated by the present invention.
Figure 5B:
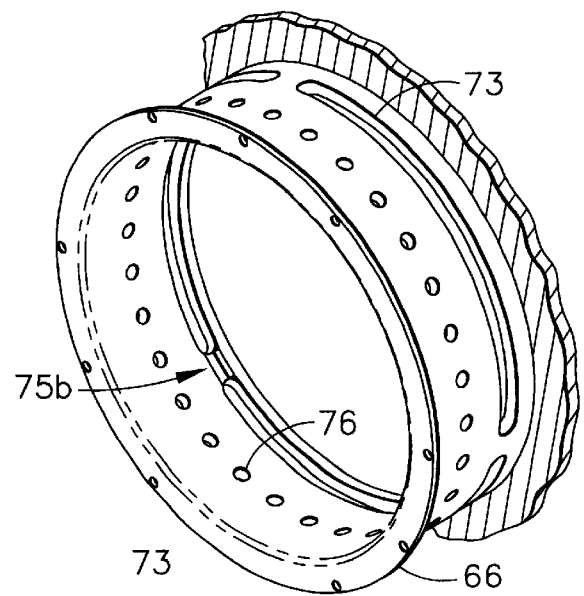
Figure 5C:
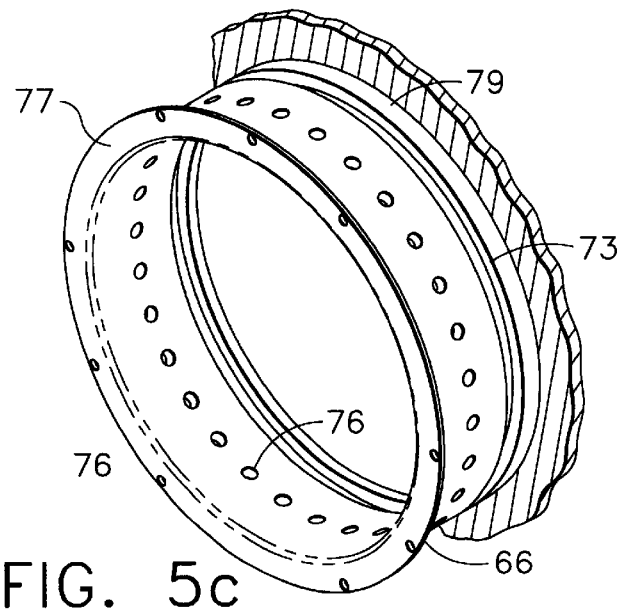
Figure 6:
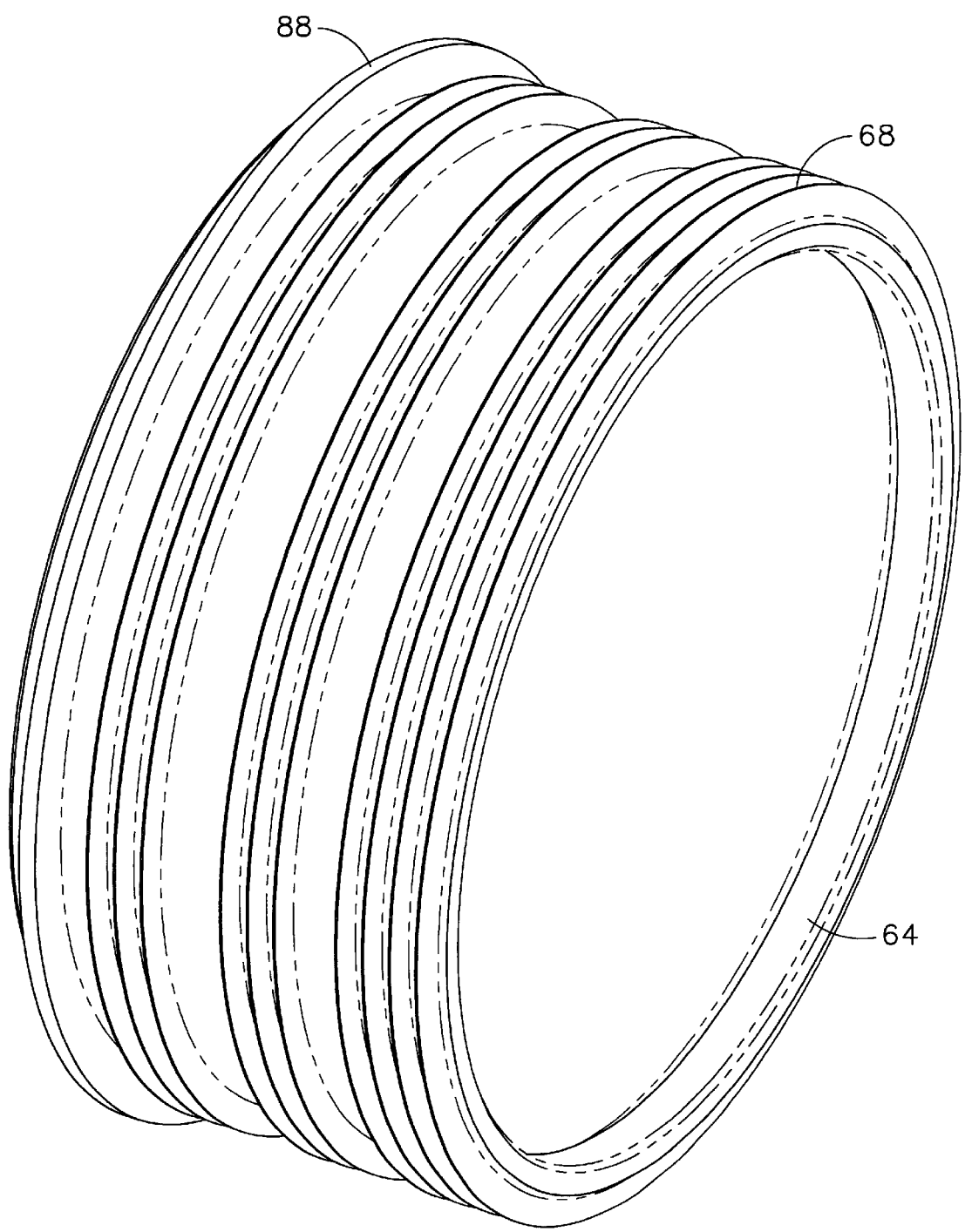
FIG. 6 shows a persepctive view of the rotating sleeve of the oil buffer seal system contemplated by the present invention.

In the preferred embodiment, the seal system 60 has three sections. A first or aft section 70 disposed between cavity 40 and a buffer air supply annulus 72. The buffer air supply annulus 72 circumscibes a first portion of the stationary sleeve 66 and receives pressurized air from the engine through duct 74. This air flows through a plurality of circumferentialy spaced holes 76 in the stationary sleeve 66 as shown in FIGS. 5a, 5b, and 5c. The first section has four knives 68. A second or intermediate section 71 is disposed between the air supply annulus 72 and a first drain annulus 80. The drain annulus 80 circumscibes a second portion of the stationary sleeve 66 and fluidly communicates with the knives 68 through a plurality of circumferentially disposed slots 73. Referring to FIGS. 5a, 5b, and 5c, in one embodiment the slots 73 are separated by a flat surface 75a. In another embodiment, the flat surfaces 75a are replaced with deepened grooves 75b. In yet another embdoiment, the sleeve 66 is comprised of two separate parts a first section 77 and a second section 79. The drain annulus 80 also fluidly communicates with a first oil drain tube 82. Mounted in the tube 82 is a 0.10 inch orifice 84. The orifice size can vary depending on the oil sump seal operating conditions. The second section 71 has three knives 68. A third or forward section 69 is disposed between the first drain annulus 80 and a second drain annulus 90. The drain annulus 90 fluidly communicates with the knives 68 in a third portion 69 of the stationary sleeve 66. The drain annulus 90 also fluidly communicates with a second oil drain tube 92. Mounted in the tube 92 is a 0.10 inch orifice 94. The orifice size can vary depending on the oil sump seal operating conditions. The third section has three knives 68 and a slinger 88.

The direction of air flow direction is illustrated by the arrows in FIG. 4. From an appropriate location in the engine, pressurized air is supplied to the buffer supply annulus 72 via conduit 74. The air from buffer supply annulus 72 travels across the knives 68 in both the forward and aft directions, as shown in the figure. In the aft direction, the air leaks past four knives 68 into the downstream cavity 40 and further into the engine gas path. In the forward direction, the air leaks past three knives into drain annulus 80. From drain annulus 80 the air is discharged through drain tube 82 overboard or into the engine's exhaust. It also leaks past three knives 68 into drain annulus 90. From drain annulus 90, the air is discharged through drain tube 92 overboard or into the engine exhaust. A portion of this air also leaks past the oil sump seal 38 and into the oil sump 37.

In the preferred embodiment, the static pressure of the air in the buffer supply annulus 72 should be maintained at a value higher than the static pressure in the oil sump 37, and the static pressure in the cavity 40 throughout the engine flight envelop. This assures that the direction of air from buffer supply annulus 72 is always towards the oil sump 37 in the forward direction and always towards the downstream cavity 40 in the aft direction. The air flowing in the forward direction prevents oil from leaking past the oil sump seal 38 and into the drain annulus 90. If for any reason, like a worn out or cracked oil sump seal, oil leaks past the oil sump seal, it is blown into the drain tube 92 and exits overboard or into engine exhaust. In the very unlikely event of the drain 92 becomes flooded by oil, the oil leaking past the three knives 68 in the third or forward section of the system 60 collects in drain annulus 80. The leaked oil in drain annulus 80 would then be blown into drain tube 82 and exits overboard or into engine exhaust. In the preferred embodiment, drain tubes 82 and 92 are sized to accommodate the maximum amount of oil that is expected to leak past the oil sump seal 38.

Figure 7:
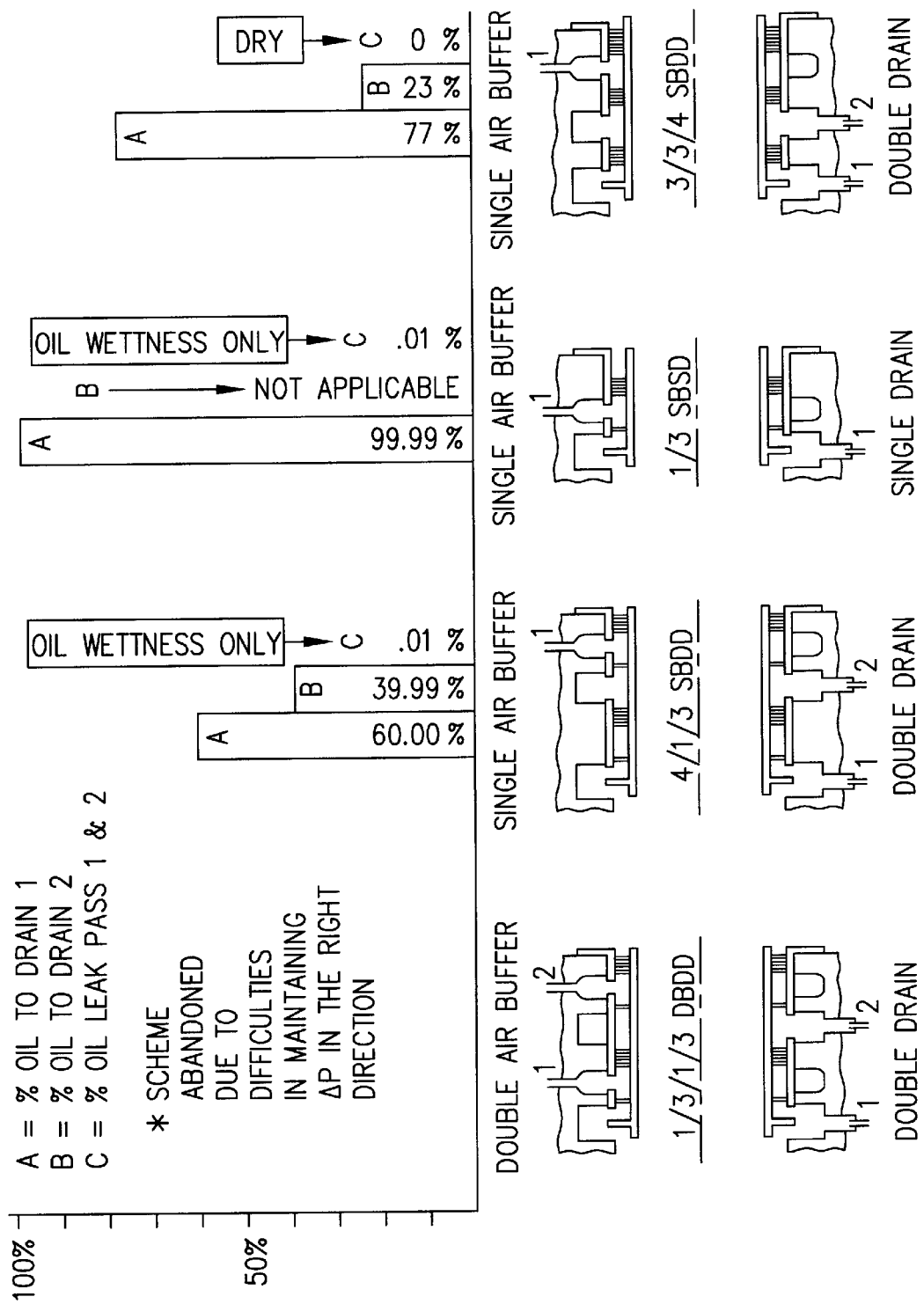
FIG. 7 shows test rig results from testing of the preferred and alternate embodiments of the oil buffer seal system contemplated by the present invention.

The preferred embodiment of the present invention along with alternate embodiments were rig tested. The results of the test are shown in FIG. 7 along with the conditions under which the tests were run.

One alternate embodiment is the double air buffer, double drain configuration, DBDD. This configuration has two air supply annulus and two oil drain tubes disposed as shown in FIG. 7. going forward to aft. The knives 68 are arranged on four groups with groups 1 and 3 having a single knife and groups 2 and 4 having three knives. Going from left to right in FIG. 7, oil was injected through drain cavity 1 and air was injected through the air buffers. Test data on this embodiment could not be obtained due to difficulties in maintaining a pressure differential in the right direction.

A second alternate embodiment is a single air buffer, double drain, SBDD. This configuration has three groups of knives with the first group having four knives, the second group having one knife and the third group having three knives. Again, oil was injected through drain cavity 1 in FIG. 7 and air was injected through the air buffers. Under test conditions, 60% of the oil flowed out through the first drain and 39.99% of the oil flowed out through the second drain. However, 0.01% of the oil leaked all the way through and out the right side of the seal.

Figure 1:
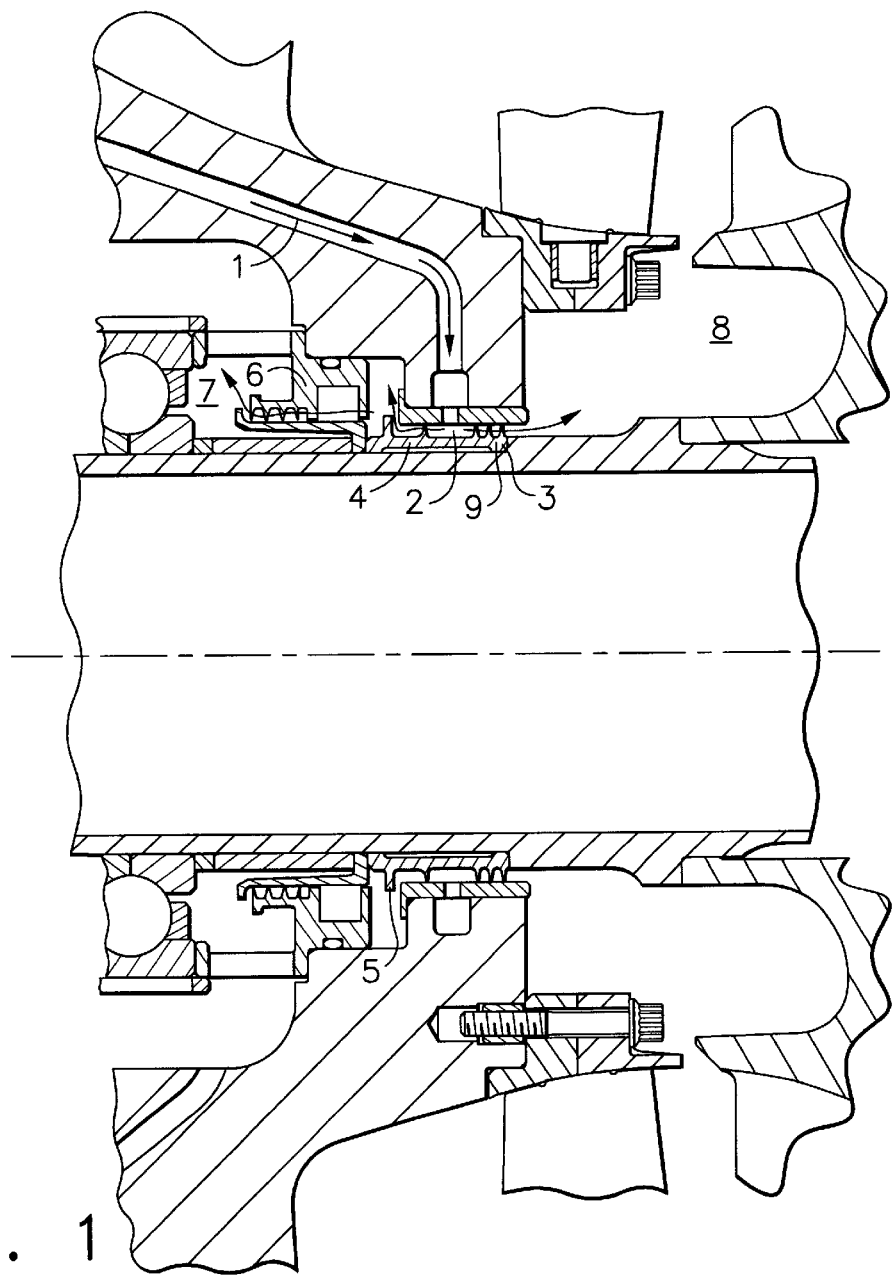
FIG. 1 is a cross-section of a prior art oil sump buffer seal.

A third alternate embodiment is a single air buffer, single drain, SBSD. This configuration has two groups of knives with the first group having one knife and the second group having three knives. This confuguration is essentially the prior art configuration shown in FIG. 1 with the addtion of an oil drain tube forward of the buffer seal. Again oil was injected into drain cavity 1 in FIG. 7 and air was injected though the air buffer. Under test conditions, 99.9% of the oil flowed out through the single oil drain, but 0.01% of the oil leaked all the way through and out the right side of the seal.

The last configuration shown in FIG. 7 is the preferred embodiment, a single air buffer, double drain system, SBDD. As in previous tests, oil was injected into drain cavity 1 in FIG. 7 and air was injected though the air buffer. Under the test conditions set forth in FIG. 7, 77% of the oil flowed out through the first oil drain and 23% flowed out through the second oil drain. No oil was detected on the right side of the seal.

Thus, a buffer seal system 60 is provided that prevents oil leaking into cavity 40 and hence into the aircraft cabin in the worst case scenario anticipated for the engine.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A buffer seal system comprising: a labyrinth seal having a first, second, and third sections; a buffer air supply annulus disposed between said first and second sections for delivering pressurized air from a conduit to said first and second sections; a first drain annulus disposed between said second and third sections; and a second drain annulus disposed adjacent said third section on the side of said third section opposite the side adjacent said first drain annulus; said third section having a slinger.

2. The system of claim 1 further comprising at least one knife seal disposed in each of said three sections.

3. The system of claim 2 wherein said first section has four knife seals, said second section has three knife seals and said third section has three knife seals.

4. The system of claim 2 wherein said first section has three knife seals, said second section has one knife seal and said third section has four knife seals.

5. The system of claim 1 further comprising a first drain tube in fluid communication with said first drain annulus and a second drain tube in fluid communication with said second drain annulus.

6. The system of claim 1 further comprising an orifice disposed in each of said drain tubes.

7. The system of claim 1 wherein said labyrinth seal comprises a first sleeve adapted for mounting to a rotating body, a second sleeve adapted to be mounted to a nonrotating body, said second sleeve circumscribing said first sleeve and being radially spaced therefrom, and a plurality of knife edges extending from said first sleeve and sealing engaging said second sleeve.

8. A buffer labyrinth seal system comprising: a labyrinth seal having a first and second sections; a buffer air supply annulus disposed between said first and second sections for delivering pressurized air from a conduit to said first and second sections; a first drain annulus disposed adjacent said second section on the side of said second section opposite the side adjacent said buffer air supply annulus; said first section having three knife seals, said second section having one knife seal and a slinger.

9. The system of claim 8 further comprising at least one knife seal disposed in each of said two sections.

10. A gas turbine comprising: a combustor; a high pressure spool having a high pressure compressor stage and a high pressure turbine stage mounted at opposite ends of a first rotatable shaft and disposed with said combustor positioned therebetween; a low pressure spool having a low pressure compressor stage and a low pressure turbine stage mounted at opposite ends of a second rotatable shaft and disposed relatively at opposite ends of said high pressure spool; housing means cooperating with said combustor and with said high and low pressure spools to define a main gas flow path through the engine; at least one bearing for rotatably supporting said first and second rotatable shafts; means including flow passages for circulating lubricant to said at least one bearing; sump seals for preventing lubricant leakage from said passages; a labyrinth seal having a first, second, and third sections; a buffer air supply annulus disposed between said first and second sections for delivering pressurized air from a conduit to said first and second sections; a first drain annulus disposed between said second and third sections; and a second drain annulus disposed adjacent said third section on the side of said third section opposite the side adjacent said first drain annulus; said third section having a slinger.

11. The engine of claim 10 further comprising at least one knife seal disposed in each of said three sections.

12. The engine of claim 11 wherein said first section has four knife seals, said second section has three knife seals and said third section has three knife seals.

13. The engine of claim 10 wherein said first section has three knife seals, said second section has one knife seal and said third section has four knife seals.

14. The engine of claim 10 further comprising a first drain tube in fluid communication with said first drain annulus and a second drain tube in fluid communication with said second drain annulus.

15. The engine of claim 14 further comprising an orifice disposed in each of said drain tubes.

16. A gas turbine engine comprising:
a combustor;
a high pressure spool having a high pressure compressor stage and a high pressure turbine stage mounted at opposite ends of a first rotatable shaft and disposed with said combustor positioned therebetween;
a low pressure spool having a low pressure compressor stage and a low pressure turbine stage mounted at opposite ends of a second rotatable shaft and disposed respectively at opposite ends of said high pressure spool;
housing means cooperating with said combustor and with said high and low pressure spools to define a main gas flow path through the engine; at least one bearing for rotatably supporting said first and second rotatable shafts;

means including flow passages for circulating lubricant to said bearings, sump seals for preventing lubricant leakage from said passages; and a labyrinth seal adjacent said sump seal and having a first section with three knife seals and a second section with one knife seal and a slinger;

a buffer air supply annulus disposed between said first and second sections for delivering pressurized air from a conduit to said first and second sections; and a first drain annulus disposed adjacent said second section on the side of said second section opposite the side adjacent said buffer air supply annulus.

\* \* \* \* \*